United States Patent [19]

Thomson et al.

[11] Patent Number: 4,620,505

[45] Date of Patent: Nov. 4, 1986

[54] APPARATUS FOR NURSING SUCKLING ANIMALS

[76] Inventors: Hugh Thomson, R.R. #1, Pefferlaw; Michel Gendron, R.R. #1, Thornton, both of Ontario,, Canada

[21] Appl. No.: 668,468

[22] Filed: Nov. 5, 1984

[30] Foreign Application Priority Data

Oct. 12, 1984 [CA] Canada ................................ 465274

[51] Int. Cl.$^4$ ........................ A01K 5/02; A01K 9/00
[52] U.S. Cl. .................................... 119/51.11; 119/71
[58] Field of Search ....................... 119/18, 51.11, 71

[56] References Cited

U.S. PATENT DOCUMENTS

| 3,307,521 | 3/1967 | Tavera et al. | 119/71 |
|---|---|---|---|
| 3,524,432 | 8/1970 | Tartar | 119/51.11 |
| 3,664,302 | 5/1972 | Wienert | 119/18 |
| 3,779,210 | 12/1973 | Blair | 119/18 |

Primary Examiner—Hugh R. Chamblee
Attorney, Agent, or Firm—Mirek A. Waraksa

[57] ABSTRACT

An automatic self-cleansing system for dispensing nutrient liquids to suckling animals is described. The system includes a liquid delivery system which can be selectively activated to dispense a number of liquids including a nutrient liquid composed for example of powdered milk and food additives mixed with water, a liquid detergent for cleansing and a rinsing liquid (most conveniently water) for rinsing of residual nutrient liquid or liquid detergent. Solenoid valves actuated by a preprogramed controller release the liquid appropriate to each nursing, cleansing and rinsing phase of operation to a conduit which conveys the liquid to a remotely located nursing device, which might be located in a pen confining the animals. The nursing device has a number of artificial nipples, and a liquid distribution system which includes a multiplicity of reservoirs corresponding in number to the artificial nipples. The internal volume of each reservoir can be selectively varied to ensure that a preselected amount of nutrient liquid is delivered to each nursing animal. A drainage conduit and associated drainage control valve serve to drain the liquid distribution system of the nursing device at appropriately timed intervals during feeding, cleansing and rinsing operations. A mechanical barrier is moved at appropriate times by the preprogrammed controller to obstruct access to the artificial nipples, as for example when liquid detergent is delivered to the nursing device for cleansing of its distribution system.

11 Claims, 10 Drawing Figures

APPARATUS FOR NURSING SUCKLING ANIMALS

FIELD OF THE INVENTION

The invention relates generally to the nutrition of animals, and more specifically to devices and systems for dispensing nutrient liquids to suckling animals.

DESCRIPTION OF THE PRIOR ART

The invention will be discussed in the context of the rearing of piglets, although the devices and systems described herein have general application to the rearing of suckling animals. Among piglets, it very often occurs that a sow has too large a litter or is otherwise unable to properly nurture its litter. The neonatal mortality rate among piglets is consequently very significant, resulting in a significant loss of profit to farmers raising pigs. To date farmers have for the most part resigned themselves to the loss of runts and some piglets from large litters, due to starvation, and a commercially-viable nursing system does not appear to have been proposed to meet their needs.

Such a nursing system would also be useful during normal nursing. Farmers are not only interested in ensuring the survival of as many piglets from a litter as possible, but must also be concerned about the health of a breeder sow which can be a relatively expensive animal. Sows can experience a weight loss of as much as 100-150 pounds when nursing a large litter. This weight loss not only jeopardizes the health of the sow, but can also delay the sow's next heat, and reduces the number of healthy litters which can be obtained from the sow. Accordingly, farmers would have need of an artificial nursing system which frees the sow from the deleterious effects of extensive nursing.

Research has recently been conducted regarding the use of artificial nursing systems to raise piglets. As a result of this research, a convenient arrangement has been found for inducing piglets to nurse from an artificial udder. A heat lamp is suspended over the artificial udder, and a second heat lamp over a resting area provided for the piglets. At nursing times, the heat lamp over the artificial udder is activated, the heat lamp over the rest area is de-activated tending to wake the piglets, and pre-recorded grunting sounds of a sow are reproduced, inducing the piglets to move towards the artificial udder. This arrangement has apparently proved very successful in inducing piglets to feed from artificial nipples. However, what is now required is a convenient system for dispensing pre-selected quantities of nutrient liquids to piglets according to their particular nutritional needs.

Some farmers have in the past attempted to save starving animals by nursing them from a hand-held milk bottle fitted with a rubber nipple. Artificial udders have been made available for simultaneous nursing of a number of suckling animals, and these have generally consisted of a single container with a multiplicity of artificial nipples directly accessing the interior of the container. Neither individual milk bottles nor such prior art udders have been particularly useful in the nursing of piglets. One practical problem is that piglets must be nursed hourly through each day of their nursing phase. Another very serious problem is that nursing piglets allowed to receive too much milk at each feeding will develop diarrhea, dehydrate and lose their ability to absorb liquid nutrients, ultimately dying from consuming what can superficially appear to be only small quantities of milk. These problems have led farmers to abandon use of such devices.

BRIEF SUMMARY OF THE INVENTION

In one aspect, the invention provides a self-cleansing system for dispensing a liquid nutrient to suckling animals. The system includes a liquid dispenser which serves to dispense a multiplicity of liquids, including a nutrient liquid, a detergent liquid and a rinsing liquid. Dispenser valves serve to selectively regulate the outletting of liquids from the liquid dispenser outlet.

The system also includes a nursing apparatus which serves to dispense liquid nutrients directly to the suckling animals. The nursing apparatus has a plurality of artificial nipples, and a distribution system which distributes liquids received from the liquid dispenser to the artificial nipples. A drainage system is provided for draining liquids from the distribution system, liquids such as residual nutrient liquid, detergent liquid and contaminated rinsing liquid. A selectively-actuatable drainage valve mechanism serves to regulate the drainage of liquids. The nursing apparatus also includes a guard mechanism, and a selectively-actuatable motor mechanism for moving the guard mechanism selectively between positions in which the guard mechanism obstructs or permits access to the artificial nipples.

The system also includes a control mechanism for regulating the operation of the system. The control mechanism preferably includes a pre-programed controller which serves to automatically actuate the dispenser valves, the drainage valve mechanism and the motor mechanism so that the system periodically performs nursing, cleansing and rinsing functions with the guard mechanism conveniently obstructing access to the artificial nipples when detergent liquid or contaminated rinsing liquid would otherwise be dispensed at the artificial nipples.

Various advantages of the system and nursing apparatus will be more apparent from a description of a preferred system below.

DESCRIPTION OF THE DRAWINGS

The invention will be better understood with reference to drawings illustrating components of a preferred embodiment of a self-cleansing system for dispensing of nutrient liquids to suckling animals, in which.

DESCRIPTION OF PREFERRED EMBODIMENT

Figure 1:
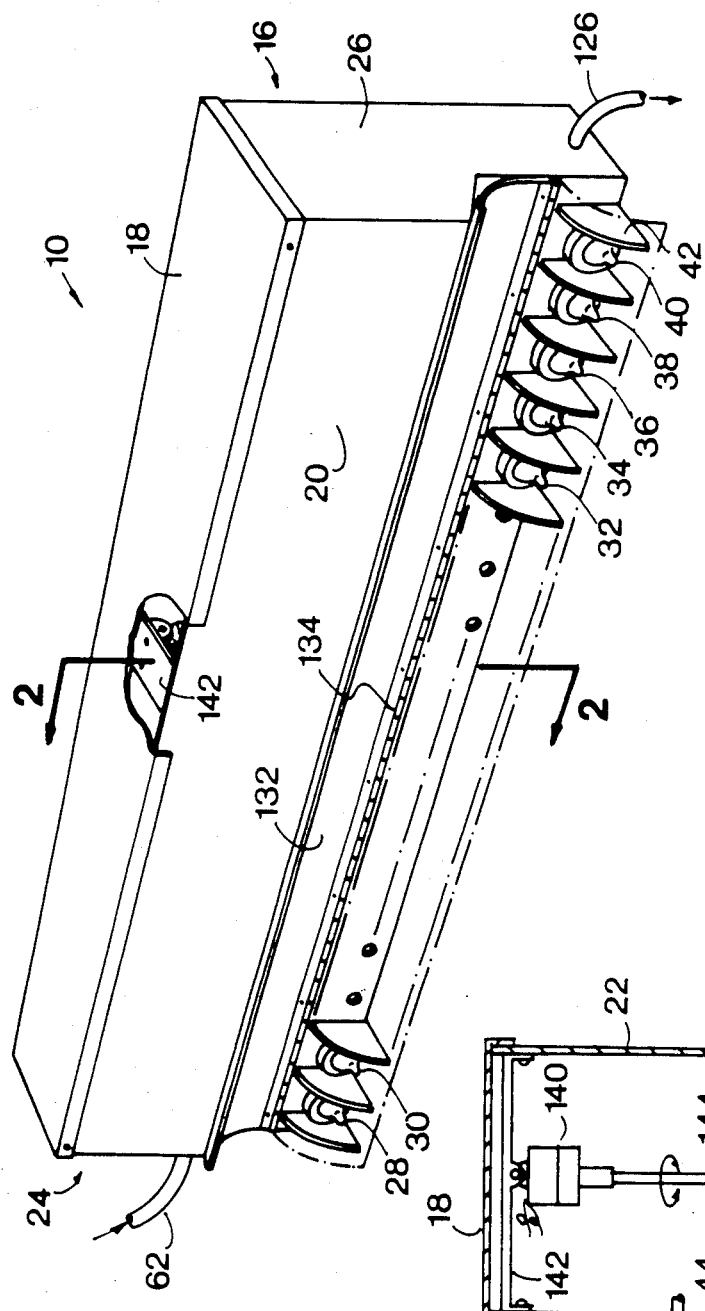
FIG. 1 is a perspective view of a preferred embodiment of nursing apparatus.
Figure 2:
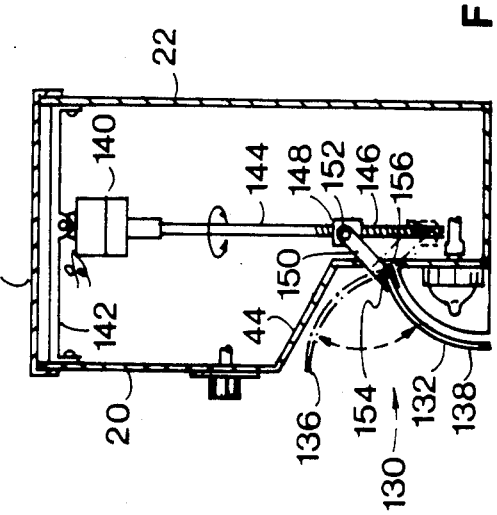
FIG. 2 is a cross-sectional view along the lines 2—2 of FIG. 1 illustrating a guard mechanism and associated motor mechanism.
Figure 3:
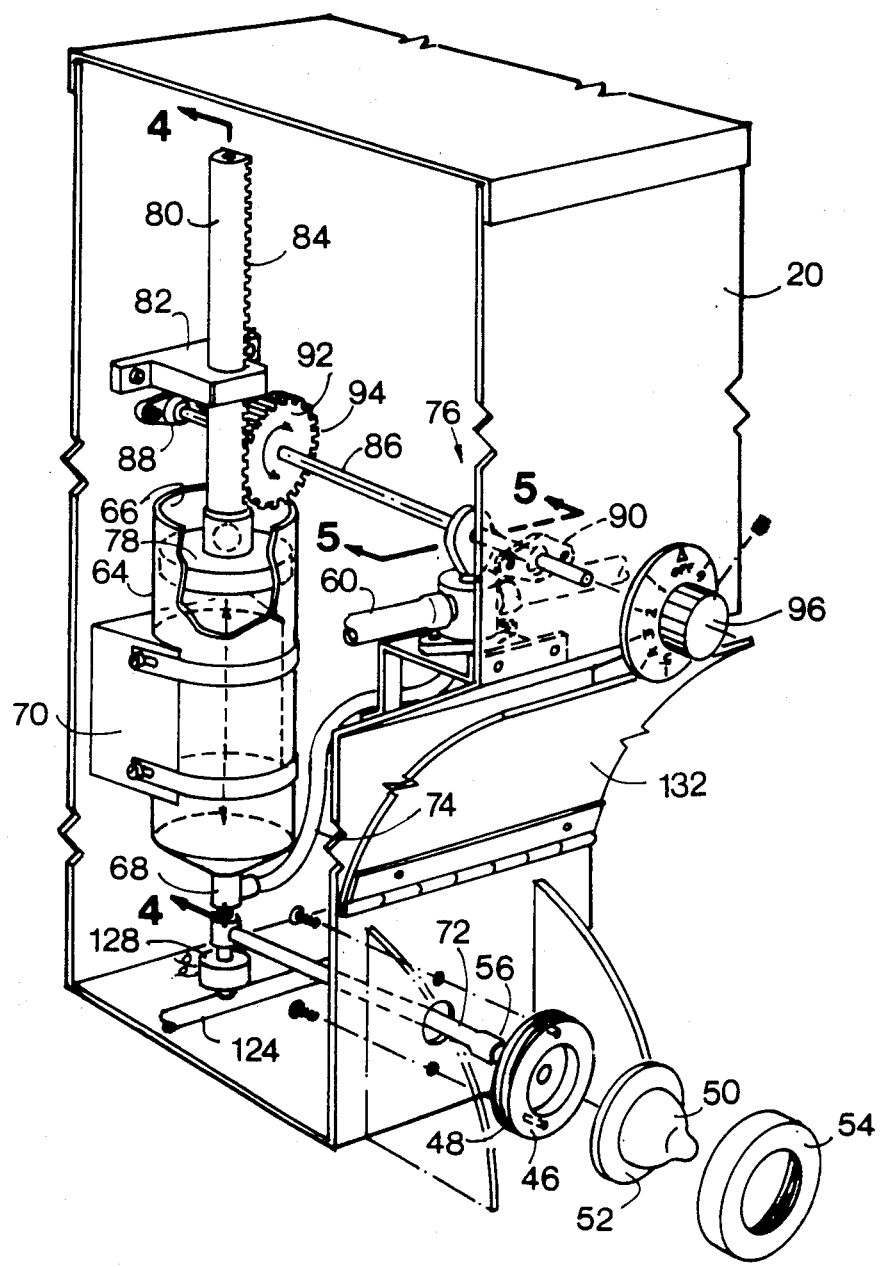
FIG. 3 is a fragmented, partially exploded perspective view of a portion of the nursing apparatus illustrating a liquid distribution system.
Figure 4:
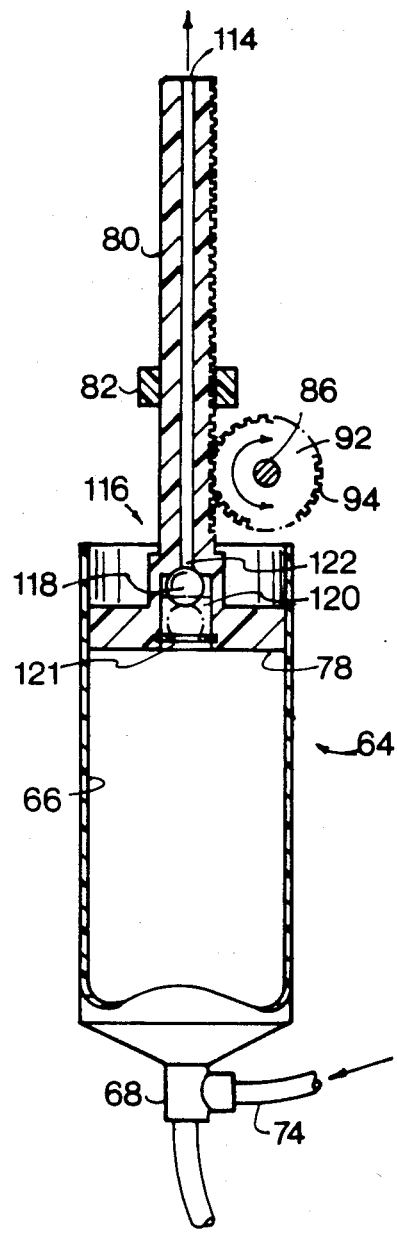
FIG. 4 is a view along the lines 4—4 of FIG. 3 showing a reservoir of variable internal volume.
Figure 7:
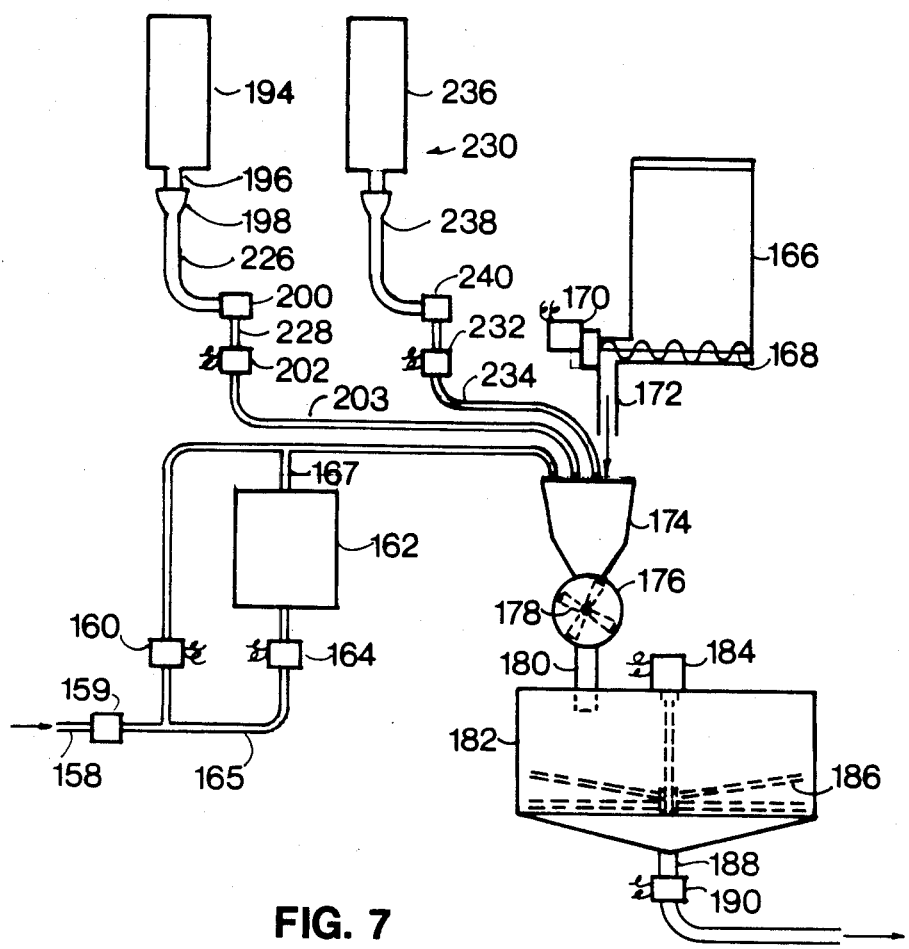
FIG. 7 is a diagrammatic illustration of a liquid dispenser which serves to dispense a multiplicity of liquids.
Figure 9:
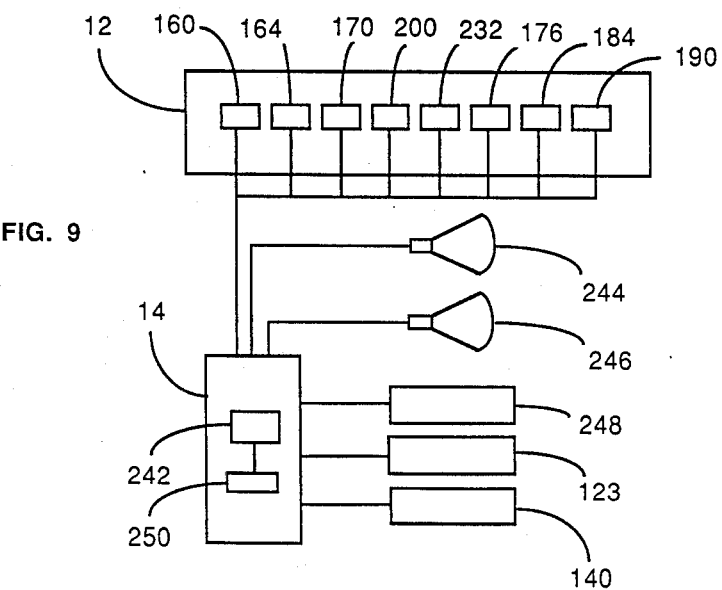
FIG. 9 is a diagrammatic representation of a control system associated with the liquid distribution; and, FIG. 10 is a timing diagram implemented by the control system.

FIGS. 1, 7 and 9 illustrate the principal components of a system for dispensing nutrient liquids to piglets. These principal components consist of a nursing apparatus 10 (FIG. 1), a liquid dispenser 12 (FIG. 7) and a programable controller 14 (FIG. 9). Very generally, the nursing apparatus 10 serves a primary function of dispensing nutrient liquids to the piglets. The liquid dispenser 12 permits selective dispensing of a nutrient liquid which is basically milk reconstituted from milk powder and water according to a formulation suitable for rearing of piglets, a liquid detergent which is a conventional milkline detergent and disinfectant, and a rinsing liquid which is plain water. The liquid dispenser permits the various liquids to be "selectively" dispensed, that is, a particular liquid is dispensed according to the particular system function being performed, namely, nursing, system disinfecting, or system rinsing. The controller 14 serves to automatically prepare and dispense the liquid required for any particular function, and to perform functions incidental to the operation of the system such as drainage and obstruction of access to the nursing apparatus 10 when milkline disinfectant is circulated in the system.

The various features and components of the nursing apparatus 10 are illustrated in the views of FIGS. 1–6. The nursing apparatus 10 includes a plastic housing 16 with a removable top 18, a front wall 20, an opposing back wall 22, a side wall 24 and an opposing side wall 26. The front wall 20 is fitted with sixteen artificial nipples, only seven artificial nipples 28–40 (even numbers only) being illustrated in FIG. 1 for convenience of illustration. The nipples are separated by quarter-circle plastic partitions (only one partition 42 being specifically indicated in FIG. 1) attached to the front wall 20 of the housing 16 in a recess 44. The partitions are intended to reduce interference between piglets at adjacent nipples during nursing. The construction of the nipple 28, which is typical of all nipples, is better illustrated in FIG. 3. The nipple 28 includes a plastic backing member 46 with an externally threaded periphery 48, screwed to the housing front wall 20, a flexible rubber nipple-shaped portion 50 with a circular peripheral flange 52, and a plastic retaining nut 54 with internal threads (not illustrated) which serves to secure the flange 52 against the backing member 46. The nipple 28 also includes a conduit 56 extending through the housing front wall 20 and permitting conveyance of liquids to the nipple-shaped portion 50.

The nursing apparatus 10 includes a liquid distribution system generally indicated by the reference numeral 58. The system 58 includes a plastic conduit 60 with an inlet end portion 62 for receipt of liquids into the nursing apparatus 10. The liquid distribution system 58 also includes sixteen reservoirs, one reservoir corresponding to each artificial nipple. Only one reservoir 64, which is typical, is illustrated in detail in FIG. 3. The reservoir 64 has a generally cylindrical internal surface 66, and a tubular extension 68 at the bottom of the reservoir 64 which serves to access the interior of the reservoir 64. The reservoir 64 is strap-clamped to a support member 70 in a generally vertical orientation, and the support member 70 is in turn attached to the housing back wall 22. A conduit 72 places the reservoir 64 in communication with the nipple 28 for transfer of liquids.

Figure 5:
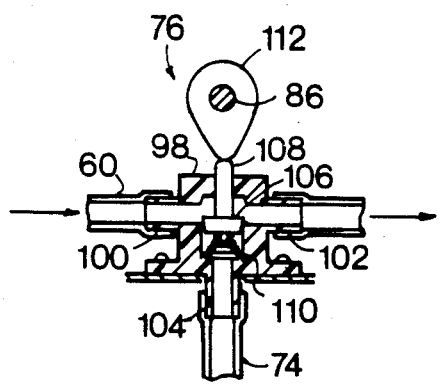
FIG. 5 is a cross-sectional view along the lines 5—5 of FIG. 3 illustrating a valve mechanism.
Figure 6:
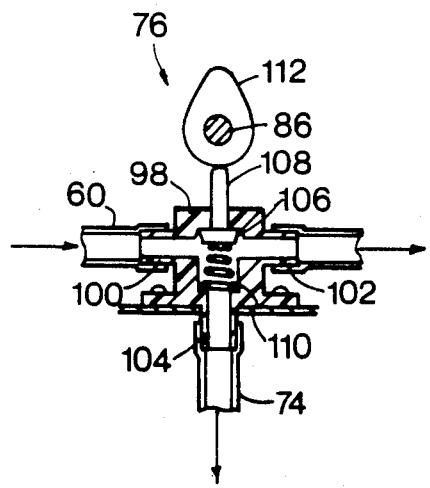
FIG. 6 is a cross-sectional view similar to that of FIG. 5 illustrating the valve mechaism in a different operating state.

A conduit 74 places the interior of the reservoir 64 in communication with the conduit 60 through a valve 76 which is illustrated in the views of FIGS. 5 and 6, and which is described in greater detail below. It should be noted that the conduit 60 is positioned above the reservoir 64 and the other reservoirs, and basically serves as a manifold for distributing liquids received by a nursing apparatus 10 to the various artificial nipples. This arrangement permits gravity feeding of liquids from the manifold conduit 60 to the various reservoirs, and serves to effectively isolate the reservoirs from one another so that during nursing each piglet receives only the nutrient liquid in the reservoir associated with the artificial nipple at which the piglet is nursing.

The internal volume of each reservoir can be selectively varied, thereby varying the amount of liquid nutrient available to each piglet. In this respect, the reservoir 64 is exemplary. The reservoir 64 has a plastic piston 78 mounted inside the reservoir 64 in sealing engagement with the internal cylindrical surface 66 and movable axially relative to the internal cylindrical surface 66 to vary the internal volume of the reservoir 64. The piston 78 is supported for such axial movement by a piston rod 80, integrally formed with the piston 78, and supported for axial movement with the piston 78 by a plastic rod support 82 attached to the back housing wall 22. The position of the piston 78 in the reservoir 64 can be adjusted by a positioning mechanism which includes a toothed track 84 extending longitudinally along the piston rod 80. The positioning mechanism also includes an axle 86 mounted for rotation by bearing supports 88, 90 between housing walls 20, 22, transverse to the piston rod 80. A gear 92 with peripheral teeth 94 meshed with the toothed track 84 is rigidly fixed to the axle 86 for rotation with the axle 86. The axle 86 extends through an opening in the housing front wall 20, and a calibrated dial 96 is rigidly fixed to the axle 86 to permit the piston 78 to be raised and lowered to select the internal volume of the reservoir 64. The dial 96 can be calibrated to correspond fairly precisely to the resultant volume of the reservoir 64. The remaining reservoirs are similarly coupled to the manifold conduit 60, and have internal volumes which can be selected by means of similar adjustment mechanisms.

The valve 76 which couples the reservoir 64 to the manifold conduit 60 serves a basic on-off function determining whether any liquid at all will be delivered to the reservoir 64. The valve 76 has a housing 98 with a tubular valve inlet 100 and an axially aligned valve outlet 102 which are oriented in-line with the conduit 60. The housing 98 has a downwardly-directed tubular outlet 104 which cummunicates with the conduit 74 for delivery of liquids to the reservoir 64. An internal valve member 106 with a valve stem 108 extending outwardly from the housing 98 is biased by a non-corrosive internal spring 110 towards an open position (illustrated in FIG. 6) which permits liquid flow from the conduit 60 to the reservoir 64. A cam 112 is rigidly fixed to the axle 86 for rotation by the dial 96. The cam 112 engages the valve stem 108, and when the dial 96 is rotated to an off setting (illustrated in FIG. 3) the cam 112 moves the valve member 106 to a closed position (illustrated in FIG. 5) in which the valve member obstructs fluid flows from the conduit 60 to the reservoir 64. By rotating the dial 96 to the off setting the associated nipple 28 is no longer available for nursing purposes. Valves similar to the valve 76 are used to couple the remaining reservoirs to the manifold conduit 60. These valves and associated controls have not been shown for ease of illustration. This arrangement allows a farmer to cause delivery of milk to only a set of nipples corresponding in number to the piglets to be nursed.

In the design of the nursing apparatus 10, steps have been taken to ensure proper venting of each reservoir during receipt of fluids. With respect to the reservoir 64, the associated venting mechanism is detailed in FIG. 4. The venting mechanism includes an axial passage 114 in the piston rod 80 which extends through the piston 78 to place the interior of the reservoir 64 in communication with the atmosphere. A valve mechanism 116 ensures that liquids flowing into the reservoir 64 from the lower-most tubular extension 68 do not rise and flow out of the passage 114. The valve mechanism 116 includes a float ball 118 retained in a chamber 120 positioned about a passage opening 122. When the reservoir 64 is full of any liquid, the float ball 118 seats against the passage opening 122 thereby preventing the escape of the fluid. When the reservoir 64 is not full, the float ball 118 is retained by a C-ring 121 which seats in a circular recess formed in the piston 78 about the chamber 120. The remaining reservoirs are vented in a similar manner.

A drainage system 123 is provided for draining fluids from the liquid distribution system 58 including the reservoirs. A drainage conduit 124 positioned below the liquid distribution system 58 extends substantially the full length of the housing 16, and has an outlet 126 which extends through the housing side wall 26, where liquids are exhausted, preferably to a drain remote from the piglets. As apparent in FIG. 3, the drainage conduit 124 communicates with the tubular reservoir extension 68 through a selectively-actuatable solenoid valve 128. A lowermost tubular conduit associated with each of the remaining reservoirs communicates with the drainage conduit 124 through similar solenoid valves, and the drainage conduit 124 functions as a manifold to receive liquids from the various parts of the liquid distribution system 58. Simultaneous actuation of the solenoid valve 128 together with the other solenoid valves associated with the drainage conduit 124 for a predetermined period of time serves to drain all liquids from the liquid distribution system 58 of the nursing apparatus 10.

The nursing apparatus 10 also includes a guard mechanism 130 whose function is to obstruct access by piglets to the artificial nipples when milkline disinfectant or contaminated rinse water fills the nursing apparatus 10. The guard mechanism includes an elongate plastic guard member 132 having a uniform quarter-circle crossection transverse to its longitudinal axis. The guard member 132 is mounted by a piano-type hinge 134 to the front wall 20. Accordingly, the guard member 132 pivots between a position 136 (stippled in FIG. 2) in which the guard member 132 permits access to the nipples and a position 138 in which the guard member 132 obstructs access to the nipples. The guard mechanism 130 includes an electric motor 140 which is suspended from a bridge member 142 extending between front and back housing walls 20, 22. The motor 140 can be selectively-actuated to rotate a vertical rod 144 with a threaded lower end portion 146. An internally threaded sleeve member 148 is threaded onto the lower rod end portion 146, and travels axially up and down along the rod 144, according to the direction in which the motor 140 rotates the rod 144. A link arm 150 has a first end portion 152 pivotally connected to the sleeve member 148 and a second end portion 154 which extends through an opening in the housing front wall 20 and which is pivotally attached to a hinge rod 156 of the hinge 134 and rigidly attached to the guard member 132. Actuation of the motor 140 consequently causes the guard member 132 to be gradually raised or lowered. Convention mechanical limit switches (not illustrated) attached to the front housing wall 20 deactivate the motor 140 whenever the guard member assumes either of the position 136, 138.

The liquid dispenser 12 includes a water supply which provides both cold water for rinsing purposes and warm water for use in reconstituting powdered milk. The water supply includes a cold water supply line 158, and a conventional pressure reducing valve 159 ensures that the cold water is supplied at constant pressure, thereby ensuring that predictable quantities of water are delivered for example to reconstitute powdered milk or to dilute a concentrated liquid detergent according to preselected ratios, independant of water pressure variations. A selectively-actuatable solenoid valve 160 controls flow of water through the cold water supply line 158. A water heater 162 dispenses the required warm water, and a solenoid valve 164 mounted on the cold water inlet 165 of the water heater 162 serves to regulate the delivery of warm water from a heater outlet conduit 167.

A hopper 166 serves to store milk powder. A worm drive 168 which can be selectively actuated by an electric motor 170 serves to drive powdered milk through a hopper outlet 172 located at the bottom of the hopper 166.

Hot water and powdered milk is delivered under gravity to a mixer hopper 174 associated with a mixer 176. The mixer 176 has a rotating mixer element 178 with four longitudinal blades that rotate at speeds of about 3,500 rpm to ensure thorough mixing of the milk powder and hot water. The mixer 176 has an outlet 180 through which the contents of the mixer 176 are emptied under gravity into a storage tank 182.

The storage tank 182 includes a mechanism for circulating its contents to ensure that the components of the reconstituted milk do not separate. This mechanism includes an electric motor 184 and a stirring element 186 which is rotated by the motor. The storage tank 182 has at its bottom a tubular outlet 188 from which the milk and all other liquids to be dispensed are outletted. The outletting of liquids from the storage tank 182 is regulated by selectively-actuatable solenoid valve 190.

The liquid dispenser 12 also includes a detergent dispenser 192. Concentrated liquid detergent is dispensed from a container 194 having a neck 196 which screw-fits into an internally threaded receptacle 198. The receptacle 198 communicates with a flow regulating device 200 which in turn communicates with a solenoid valve 202 that can be selectively actuated to dispense roughly predetermined quantities of the concentrated detergent (in this case a milkline disinfectant) into the mixer hopper 174 through an outlet conduit 203. Water for dilution of the concentrated detergent is also received in the mixer hopper 174 at such times by actuation of the solenoid valve 160 on the cold water supply line 158. The resultant mixture then flows downwardly through the mixer 176 into the storage tank 182 for release by the solenoid valve 190 to the nursing apparatus 10. This arrangement ensures that not only the nursing apparatus 10 is disinfected, but also the mixer 176 and storage tank 182. The detergent container 194 is preferrably a ventable bottle with an opening sealed with metal foil, and the receptacle 198 is preferrably fitted with a piercing element which breaks the foil when the neck 196 of the detergent container 194 is screwed into the receptacle 198.

Figure 8:
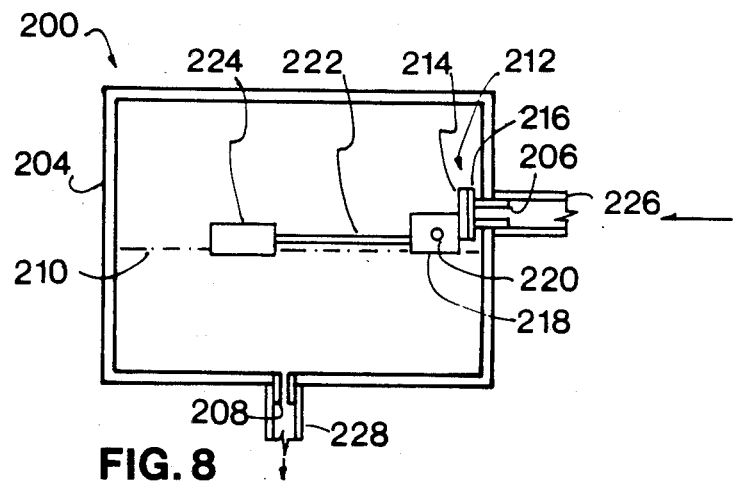
FIG. 8 is a cross-sectional view of a flow regulating device associated with the liquid dispenser.

The flow regulating device 200 accomodates variations in liquid pressure and consequently variations in the rate of delivery of the milkline disinfectant due to gradual emptying of the contents of the detergent container 194 in normal operation. The device 200 is illustrated in FIG. 8, a cross-sectional view in a vertical plane dividing the device 200 into substantially symmetric halves. The device 200 includes a reservoir 204 intended to store about 1 fluid ounce of concentrated milkline disinfectant at all times. The reservoir 204 has an inlet conduit 206 through which concentrated milkline disinfectant is received under gravity from the detergent container 194, and an outlet conduit 208 from which the concentrated milkline disinfectant is delivered under gravity to the solenoid valve 202. The device 200 includes a float-valve stopper mechanism which allows the reservoir to fill with milkline disinfectant only to a preselected level 210. The stopper mechanism includes a valve member 212 consisting of a plastic backing member 214 to which a sheet of rubber material 216 is attached. The valve member 210 is fixed to a plastic pivot member 218 which pivots about a generally horizontal pivot rod 220 supported from the walls of the reservoir 204. The pivot member 218 is attached by a plastic lever arm 222 to a block 224 of foamed plastic floatation material. The block 224 under the buoyant effect of contained milkline detergent will tend to pivot the valve member 212 into sealing engagement with the inlet conduit 206, whenever the milkline disinfectant rises to the preselected level 210, thereby discontinuing flow of milkline disinfectant from the detergent container 194 to the reservoir 204. Steps are taken to ensure that the solenoid valve 202 cannot empty the reservoir 204 faster than the detergent container 194 dispenses milkline disinfectant to the reservoir 204. First, the inlet conduit 206 and an associated plastic conduit 226 which transfers milkline disinfectant from the detergent container 194 to the reservoir 204 are both of greater internal cross-sectional area (by about 4 fold) than the internal area of the outlet conduit 208 and an associated conduit 228 which transfers milkline disinfectant from the reservoir 204 to the solenoid valve 202. Second, the conduit 226 is selected to have a vertical height at least equal to the total vertical height between the inlet conduit 206 and the detergent dispenser outlet conduit 203. This arrangement ensures that a greater head of pressure tends to drive liquid detergent into the reservoir 204 than out of the reservoir 204, under reduced restrictions to liquid flow. Accordingly, a substantially constant head of pressure tends to exhaust milkline disinfectant from the outlet conduit 208, ensuring a predictable rate of delivery of milkline disinfectant from the liquid dispenser 12.

The liquid dispenser 12 also includes an additive dispenser 230 which serves to dispense liquid nutritional additives for mixing with milk mixture to be made available in the nursing apparatus 10 for consumption by the piglets. Dispensing of the additive is regulated by a solenoid valve 232 which can be selectively actuated to permit roughly predetermined quantities of additive to be dispensed through an outlet conduit 234 to the mixer hopper 174 and ultimately the storage tank outlet 188. The additive is stored in concentrated form in a vented additive container 236 which is fastened to a receptacle valve 238 in a manner analogous to the fastening of the detergent container 194 to the receptacle 198. A flow regulating device 240, similar to the device 200, accomodates variations in liquid additive pressure due to gradual emptying of the additive container 236.

Figure 10:
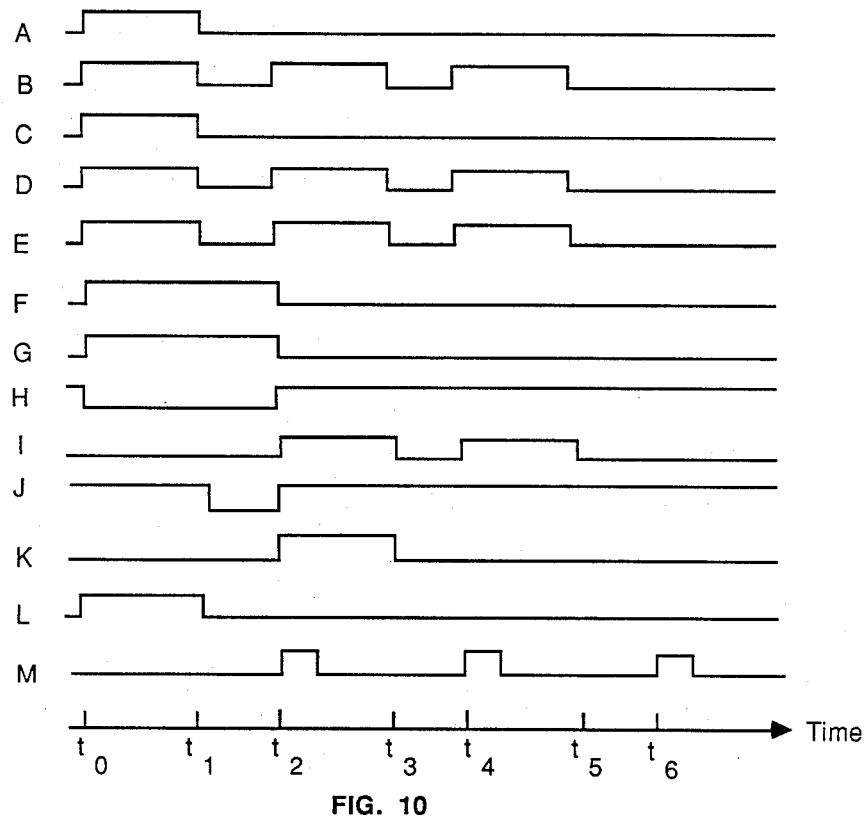

Control of the operation of the system will be better understood with reference to FIGS. 9 and 10 which show respectively a preprogramed controller 14 including a timing mechanism 242 together with the various system components controlled, and a timing diagram implemented by the controller 14 and illustrating the operating state of various system components through a typical cycle of operation. It should be noted that as illustrated in FIG. 8, the overall nursing system incorporates a nursing lamp 244 which can be actuated to heat the nursing apparatus 10, a sleep area lamp 246 which heats the area where the piglets normally sleep, and a recorder 248 which serves to produce a sow call. The purpose and function of the components 244, 246 and 248 will be understood from the description above of prior art research.

A typical cycle or period of system operation will be described with reference to FIG. 9. At time $t_0$ the controller 14 prepares the system for delivery of milk including nutritional additives to the nursing apparatus 10. The worm drive motor 170 is actuated to commence delivery of milk powder, and the water heater solenoid valve 164 is actuated to dispense warm water. The solenoid 232 is actuated to dispense liquid additive. The mixer 176 is actuated to mix the milk powder, the additive and the warm water during delivery of these components to the storage tank 182. The storage tank outlet solenoid valve 190 is closed to permit accumulation of the milk in the storage tank 182, and the stirring element motor 184 is actuated to circulate tank contents. At the same time, the controller 14 turns off the sleep area lamp 246, turns on the nursing lamp 244 and actuates the recorder 248 to produce sow calls. The nursing apparatus 10 is empty of liquids, and the drainage system 123 is in a closed or off state permitting accumulation of liquids in the nursing apparatus 10.

At time $t_1$, the controller 14 prepares the system for delivery of milk and nursing. The drainage system 123 remains in a closed state, and the outlet solenoid valve 190 of the liquid dispenser 12 is actuated to deliver milk to the nursing apparatus 10. The guard motor 140 is actuated to raise the guard mechanism to permit access to the artificial nipples. Delivery of milk powder and additive is discontinued, but delivery of the warm water and operation of the mixer 176 continue for about 1 second to clear the hopper 174 and mixer 176 of residual milk powder. Nursing is then allowed for a period of about two minutes.

At time $t_2$, the controller 14 actuates the system for discontinuance of nursing. The nursing area lamp 244 is turned off, the sleeping area lamp 246 is turned on and the recorder 248 is rewound in preparation for the next nursing phase. The guard mechanism motor 140 is actuated to lower the guard member 132. The drainage solenoid valves of the drainage system 123 are actuated to drain the nursing apparatus 10 of residual milk.

At time $t_2$, the controller 14 also prepares the system for cleansing operations. The outlet solenoid valve 190 below the storage tank 182 is closed to permit accumulation of liquids in the storage tank 182. The cold water supply solenoid valve 160 is actuated to deliver water, and solenoid valve 203 is actuated to dispense concentrated detergent. The mixer hopper 176 is actuated to mix the detergent and the cold water during delivery of these components to the storage tank 182. The stirring element motor 184 is also actuated to circulate the accumulating contents of the storage tank 182.

At time $t_3$, the controller 14 stops preparation of detergent solution and releases the solution to the nursing apparatus 10. The cold water supply solenoid valve 160 is closed, the detergent dispensing solenoid valve 203 is closed, the mixer 176 and the stirring element motor 184 are shut off, and the drainage solenoid valve 128 and other associated solenoid drainage valves are closed to permit accumulation of detergent solution in the nursing apparatus 10. The outlet solenoid valve 190 below the storage tank 82 is actuated to release the detergant solution to the nursing apparatus 10. The cleansing process continues for a period of about two minutes.

At time $t_4$, the controller 14 prepares the system for rinsing. The drainage solenoid valve 128 and other associated drainage solenoid valves of the drainage system 123 are opened to release the liquid detergent in the nursing apparatus 10. The outlet solenoid valve 190 is closed to permit accumulation of liquids in the storage tank 182, the mixer 176 and the stirring element motor 184 are activated, and the cold water supply solenoid valve 160 is actuated to deliver cold water to the storage tank 182.

At time $t_5$, the controller 14 prepares the system for release of the rinse water accumulated in the storage tank 182. The drainage solenoid valve 128 and other associated drainage solenoid valves are closed, the mixer 176 and the stirring element motor 184 are shut off, and the cold water line solenoid valve 190 is closed. The outlet solenoid valve 160 is actuated to release the rinse water. Rinse water remains in the nursing apparatus 10 for about two minutes.

At time $t_6$, the controller 14 actuates the drainage system 123 for a preselected period of time sufficient to drain the rinsing liquid from the nursing apparatus 10, leaving the liquid distribution system 58 empty and awaiting the next phase of preparation and delivery of milk. The system has now proceeded through one cycle or period of operation and is in the same initial state characteristic of time $t_0$. The entire cycle will repeat typically every hour.

The timing mechanism 242 includes a timing adjustment mechanism 250 which can be operated by the farmer to select the duration of the liquid preparation phases of operation. In particular, the farmer will wish to increase the total quantity of milk dispensed by the liquid dispenser 12 to meet the nutritional requirements of his piglets as they quickly grow during their nursing stage or as he places additional piglets on the nursing system. He may wish to decrease the total quantity of milk dispensed, for example, as he removes piglets from the nursing system or starts with a new litter. More specifically, he will vary the internal volume of the reservoirs in the nursing apparatus 10, and will wish to deliver to those reservoirs, very approximately, only the quantity of milk required to fill the reservoirs. In the nursing system, the total quantity of milk dispensed depends on the length of time the warm water supply solenoid valve 164 is actuated to deliver water, the additive dispenser solenoid valve 232, to dispense additives, and the worm drive 168, to deliver milk powder.

The duration of this actuation time can be selected with the timing adjustment mechanism 250, and this adjustment may typically be done on a daily basis. The mechanism 250 simultaneously adjusts the lengths of time in each cycle during which the liquid detergent dispenser solenoid valve 202 and cold water supply solenoid valve 100 are actuated during preparation of detergent liquid, and the solenoid valve 160 is actuated to dispense rinse water, to ensure that sufficient milkline disinfectant and rinse water are delivered, for example, when the total volume of the reservoirs is increased. In this regard it should be noted that the liquid dispenser 12 dispenses substantially the same quantities of milk, milkline disinfectant and rinse water, although with the latter two liquids delivery of greater than minimum required quantities is not critical, and may in fact be preferrable to ensure proper cleansing and rinsing. Briefly summarizing, the volume of liquid dispensed by the liquid dispensing system 12 in each phase of operation is determined by the length of time the appropriate solenoid valves (and the worm drive 168) are actuated, and the timing adjustment mechanism 250 permits the duration of actuation to be selectively varied, without affecting the overall duration of each cycle of operation which is set at 1 hour. It should be noted that the solenoid valves of the nursing system are all biased to be normally shut off, unless electrically actuated to permit liquid flows, except for the storage tank outlet solenoid 140 which is normally open unless actuated to close.

The storage tank outlet valve 190, the mixer 176 and the stirring element motor 184 are normally actuated throughout each phase of liquid preparation and accumulation. Accordingly, the timing adjustment mechanism 150 simultaneously varies the length of their periods of actuation to correspond substantially to the length of time otherwise set for liquid preparation and accumulation.

Implementation of the required controller 14, including the timing mechanism 242 and timing adjustment mechanism 250, will be readily apparent to one skilled in the art of controller design in view of the description of operation above, or by examination of the timing diagram of FIG. 10, which is described below.

The timing diagram of FIG. 10 shows 13 individual timing lines A-M inclusive. These timing lines show the operating states of various nursing system components, the correspondence between the timing lines and components being as follows:

A: worm drive motor 170
B: mixer 176
C: water heater solenoid valve 164
D: storage tank outlet solenoid valve 190
E: stirring element motor 184
F: nursing lamp 244
G: sow call recorder 248
H: sleeping area lamp 246
I: cold water supply solenoid valve 160
J: guard member 132
K: detergent dispenser solenoid valve 232
L: additive dispenser solenoid valve 202
M: drainage system solenoid valves (including valve 128)

In general, an upward leading edge in a timing line indicates activation of the associated system components, and a downward trailing edge, de-activation or a return to a normal state. Activation of the solenoid valves implies passage of liquids, except for the storage tank solenoid valve which is normally open. With respect to the guard member 132, however, an upward leading edge in the timing line J indicates a transition to a position in which access to the artificial nipples is obstructed, and a downward leading edge, a transition to a position in which access to the artificial nipples is permitted. The cycle of operation illustrated is exemplary of a particular setting for liquid preparation phases, and the timing waveforms illustrated may be extended or contracted, depending on the volume of liquids to be prepared.

Several advantages of the nursing system and nursing apparatus 10 should be noted. First, the internal volume of the reservoirs of the nursing apparatus 10 can be periodically adjusted to accomodate the increasing nutritional requirements of a set of piglets on an individual basis. The set might be composed of runts and excess piglets from large litters, all of different ages, and having different nutritional requirements. It is expected, based on observed behavior of nursing piglets with a sow, that once each piglet of the set has nursed at a particular artificial nipple, he will thereafter return to that particular nipple to nurse further. Accordingly, once the association between a particular piglet and a particular artificial nipple is noted, the volume of the reservoir associated with the particular nipple can be varied, for example on a 24 hour basis, to ensure that each piglet receives the quantity of milk appropriate for his stage of development, which may initially be as little as 15-20 cc each hour, and ultimately about 100 cc, the maximum volume of each reservoir in the particular embodiment illustrated. Second, the nursing system can dispense milk automatically, hourly, to meet the feeding pattern of nursing piglets, and can cleanse and rinse itself, without intervention of the farmer. Moreover, the nursing system can automatically reconstitute milk from non-perishable components, requiring even less attendance by the farmer.

It will be appreciated that particular embodiments and aspects of the invention have been described, and that modifications may be made therein without departing from the spirit of the invention or the scope of the appended claims. One modification which should be noted is that the artificial nipples and associated reservoirs need not be mounted in a single housing. Instead, each nipple and associated reservoir could be located, for example, in particular pens individually confining the nursing animals. In such circumstances, the guard member would consist of separate guard member components, one in each pen, with its own actuating mechanism and motor. This would be particularly useful, for example, where the nursing animals cannot be expected to nurse from a particular artificial nipple, unless the animals can access only individual nipples. Also, the components of liquid dispenser 12 can be mounted in a single housing or can be mounted on any suitable support structure in separated relationship provided that communication of liquid and powdered materials between the various components is ensured.

We claim:

1. A self-cleansing system for dispensing a liquid nutrient to suckling animals, comprising:
    liquid dispensing means for selectively dispensing a multiplicity of liquids including a nutrient liquid, a detergent liquid and a rinsing liquid which is innocuous to the animals, the liquid dispensing means including selectively-actuatable dispenser valve means for selectively regulating the outletting of liquids from the liquid dispensing means;
    nursing means for dispensing the liquid nutrient to the suckling animals, the nursing means including
    (a) inlet means for receiving liquids from the liquid dispensing,
    (b) a plurality of artificial nipples,
    (c) liquid distribution means communicating with the inlet means for distributing the liquid to the artificial nipples,
    (d) drainage conduit means for draining liquids from the liquid distribution means,
    (e) selectively-actuatable drainage valve means for regulating the drainage of liquids from the drainage conduit means,
    (f) a guard mechanism,
    (g) selectively-actuatable motor means for moving the guard mechanism selectively between a first position in which the guard mechanism obstructs access to the artificial nipples and a second position in which the guard mechanism permits access to the artificial nipples, and,
    control means for use in selectively actuating the dispenser valve means, the drainage valve means and the motor means.

2. A system as claimed in claim 1 in which the control means include timing means for automatically and periodically actuating the dispenser valve means, the drainage valve means and the motor means, the timing means being adapted in each period of automatic actuation to perform at least the following steps:
    (a) actuating the dispenser valve means to cause a preselected quantity of the liquid nutrient to be received by the nursing means and the motor means to move the guard mechanism to the second position to permit access to the artificial nipples;
    (b) actuating the drainage valve means a preselected time after the liquid nutrient has been received by the nursing means to drain residual liquid nutrient from the liquid distribution means;
    (c) actuating the motor means a preselected time after the nutrient liquid has been received the nursing means to move the guard mechanism to the first position obstructing access to the artificial nipples;
    (d) actuating the dispenser valve means after the guard mechanism has been moved to the first position to cause a preselected quantity of detergent liquid to be received by the nursing means;
    (e) actuating the drainage valve means a preselected time after the detergent liquid has been received by the nursing means to drain the detergent liquid from the distribution means;
    (f) actuating the dispenser valve means after drainage of the liquid detergent from the distribution means to cause a preselected quantity of rinsing liquid to be received by the nursing means; and,
    (g) actuating the drainage valve means a preselected time after the receipt of the rinsing liquid by the nursing means to drain the rinsing liquid from the distribution means.

3. A system as claimed in claim 1 in which the liquid dispensing means comprise:
    a container for receiving powdered food and having a container outlet;
    selectively-actuatable drive means for driving powdered food in the container out of the container outlet;
    water supply means for supplying water;
    mixing means in communication with the container outlet and the water supply means for receiving and mixing the powdered food and the water to produce a nutrient liquid mixture, the mixing means having a mixer outlet where the nutrient liquid mixture is released from the mixing means;

a storage tank in communication with the mixer outlet for receipt of the nutrient liquid mixture, and having a storage tank outlet in communication with the inlet means of the nursing means; and, circulation means associated with the storage tank for circulating liquids in the storage tank.

4. A system as claimed in claim 3 in which the dispenser valve means comprise:

water supply valve means for regulating the supply of water from the water supply means; and, storage tank valve means for regulating release of liquids from the storage tank outlet to the inlet means of the nursing means.

5. A system as claimed in claim 4 in which the control means include timing means for automatically and periodically actuating the dispenser valve means, the drainage valve means and the motor means, the timing means being adapted in each period of automatic actuation to perform at least the following steps;

(a) actuating the dispenser valve means to cause a preselected quantity of the liquid nutrient to be received by the nursing means and the motor means to move the guard mechanism to the second position to permit access to the artificial nipples;

(b) actuating the drainage valve means a preselected time after the liquid nutrient has been received by the nursing means to drain residual liquid nutrient from the liquid distribution means;

(c) actuating the motor means a preselected time after the nutrient liquid has been received by the nursing means to move the guard mechanism to the first position obstructing access to the artificial nipples;

(d) actuating the dispenser valve means after the guard mechanism has been moved to the first position to cause a preselected quantity of detergent liquid to be received by the nursing means;

(e) actuating the drainage valve means a preselected time after the detergent liquid has been received by the nursing means to drain the detergent liquid from the distribution means;

(f) actuating the dispenser valve means after drainage of the liquid detergent from the distribution means to cause a preselected quantity of rinsing liquid to be received by the nursing means; and, (g) actuating the drainage valve means a preselected time after the receipt of the rinsing liquid by the nursing means to drain the rinsing liquid from the distribution means.

6. A system as claimed in claim 4 in which the liquid dispenser means comprise:

liquid detergent dispensing means for storing a liquid detergent and having a detergent outlet in communication with the mixing means for dispensing of the liquid detergent to the mixing means; and, the dispenser valve means include selectively-actuatable detergent valve means for regulating the dispensing of the liquid detergent from the detergent outlet to the mixing means.

7. A system as claimed in claim 6 in which the control means include timing means for automatically and periodically actuating the dispenser valve means, the drainage valve means and the motor means, the timing means being adapted in each period of automatic actuating to perform at least the following steps:

(a) actuating the dispenser valve means to cause a preselected quantity of the liquid nutrient to be received by the nursing means and the motor means to move the guard mechanism to the second position to permit access to the artificial nipples;

(b) actuating the drainage valve means a preselected time after the liquid nutrient has been received by the nursing means to drain residual liquid nutrient from the liquid distribution means;

(c) actuating the motor means a preselected time after the nutrient liquid has been received by the nursing means to move the guard mechanism to the first position obstructing access to the artificial nipples;

(d) actuating the dispenser valve means after the guard mechanism has been moved to the first position to cause a preselected quantity of detergent liquid to be received by the nursing means;

(e) actuating the drainage valve means a preselected time after the detergent liquid has been received by the nursing means to drain the detergent liquid from the distribution means;

(f) actuating the detergent valve means after drainage of the liquid detergent from the distribution means to cause a preselected quantity of rinsing liquid to be received by the nursing means; and, (g) actuating the drainage valve means a preselected time after the receipt of the rinsing liquid by the nursing means to drain the rinsing liquid from the distribution means.

8. A self-cleansing system for dispensing liquid nutrients to sucking animals, comprising:

liquid dispensing means for selectively dispensing liquids including a nutrient liquid, a detergent liquid and a rinsing liquid;

nursing means for dispensing the nutrient liquid to the suckling animals, the nursing means including (a) a plurality of artificial nipples, (b) inlet means for receiving liquids dispensed from the liquid dispensing means, (c) liquid distribution means communicating with the inlet means for distributing the liquids received to the artifical nipples, (d) drainage conduit means for draining liquids from the liquid distribution means and the artificial nipples, (e) drainage valve means for regulating drainage of liquids by the drainage conduit means, (f) guard means for controlling access to the artificial nipples by the suckling animals, the guard means being actuable selectively to obstruct access to the artificial nipples and to permit access to the nipples;

control means for use in selectively actuating the liquid dispensing means, the drainage valve means and the guard means.

9. A system as claimed in claim 8 in which the control means include automatic actuation means for automatically and periodically actuating the liquid dispensing means, the drainage valve means and the guard means, the automatic means being adapted during each period of automatic actuation to (a) actuate the liquid dispensing means to dispense to the nursing means in a preselected order and at spaced apart intervals the nutrient liquid, the detergent liquid and the rinsing liquid whereby the nursing means are filled at spaced apart intervals with the respective liquid;

(b) actuate the drainage valve means at preselected intervals to drain the nutrient, detergent and rinsing liquids from the liquid distribution means and the artificial nipples;

(c) actuate the guard means to permit access to the artificial nipples when nutrient liquid is distributed by the liquid distribution means to the artificial nipples and to obstruct access to the artificial nipples at least when the detergent liquid is distributed by the liquid distribution means to the artificial nipples.

10. A system as claimed in claim 8 in which the control means include timing means for automatically and periodically actuating the liquid dispensing means, the drainage valve means and the guard means, the timing means being adapted in each period of automatic actuation to perform at least the steps of:

(a) actuating the liquid dispensing means to cause a preselected quantity of nutrient liquid to be received by the nursing means and the guard means to permit access to the artificial nipples;

(b) actuating the drainage valve means a preselected time after the nutrient liquid has been received by the nursing means to drain residual nutrient liquid from the liquid distribution means;

(c) actuating the guard means a preselected time after the nutrient liquid has been received by the nursing means to obstruct access to the artificial nipples;

(d) actuating the liquid dispensing means after the guard mechanism has been actuated to obstruct access to the artificial nipples to cause a preselected quantity of detergent liquid to be received by the nursing means;

(e) actuating the drainage valve means a preselected time after the detergent liquid has been received by the nursing means to drain the detergent liquid from the liquid distribution means.

11. A system as claimed in claim 8 in which the control means include timing means for automatically and periodically actuating the liquid dispensing means, the drainage valve means and the guard means, the timing means being adapted in each period of automatic actuation to perform at least the steps of:

(a) actuating the liquid dispensing means to cause a preselected quantity of the nutrient liquid to be received by the nursing means and the guard means to permit access to the artificial nipples;

(b) actuating the drainage valve means a preselected time after the nutrient liquid has been received by the nursing means to drain residual nutrient liquid from the liquid distribution means;

(c) actuating the guard means a preselected time after the nutrient liquid has been received by the nursing means to obstruct access to the artificial nipples;

(d) actuating the liquid dispensing means after the guard mechanism has been actuated to obstruct access to the artificial nipples to cause a preselected quantity of detergent liquid to be received by the nursing means;

(e) actuating the drainage valve means a preselected time after the detergent liquid has been received by the nursing means to drain the detergent liquid from the liquid distribution means.

(f) actuating the liquid dispensing means after drainage of the liquid detergent to cause rinsing liquid to be received by the nursing means; and, (g) actuating the drainage valve means a preselected time after the receipt the rinsing liquid by the nursing means to drain the rinsing liquid from the liquid distribution means.

* * * * *